Dec. 13, 1966  E. E. PRICE  3,291,554
OPTICAL NEUTRAL CONTROLLABLE DENSITY FILTER
Filed Feb. 19, 1963  2 Sheets-Sheet 1
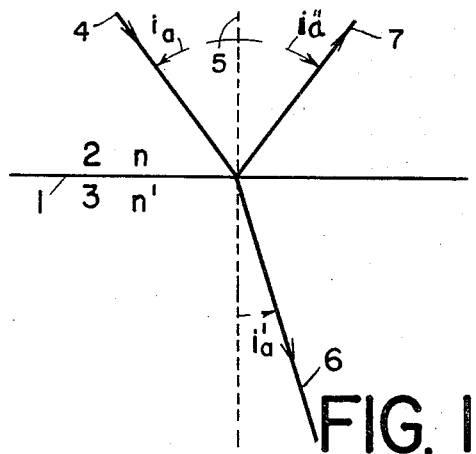
FIG. 1
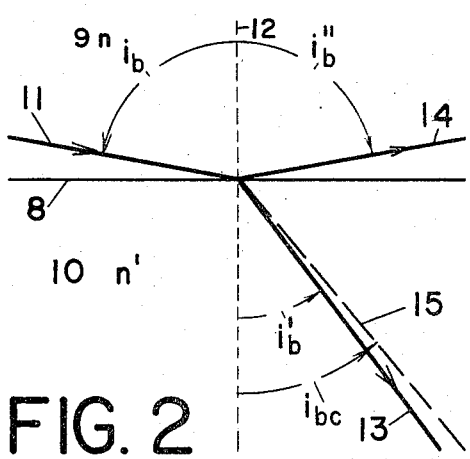
FIG. 2
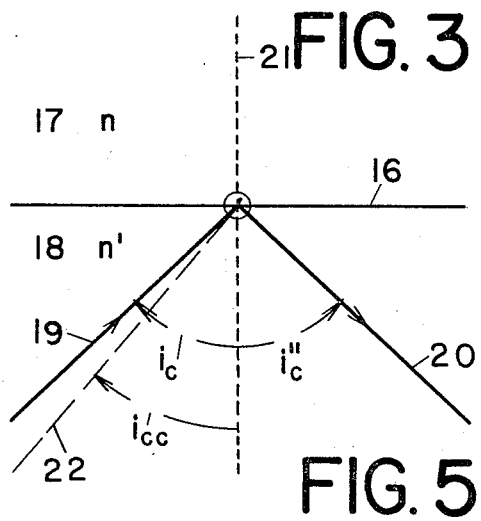
FIG. 3 FIG. 5
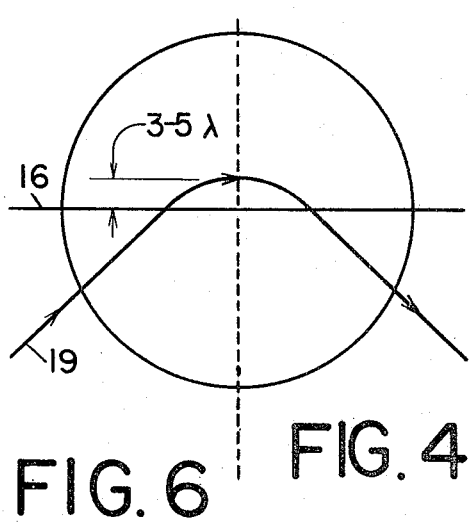
FIG. 4 FIG. 6
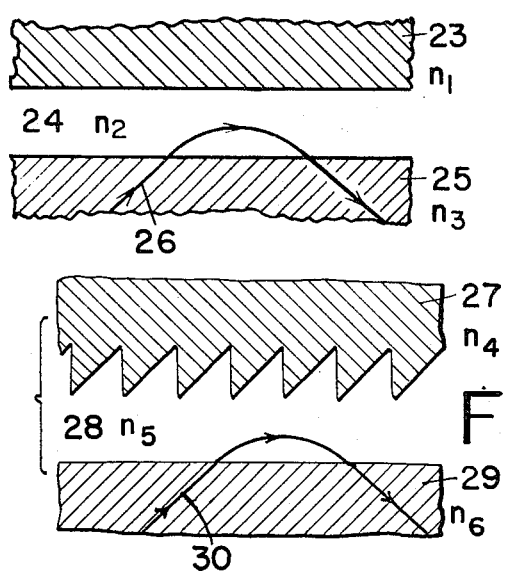
FIG. 7
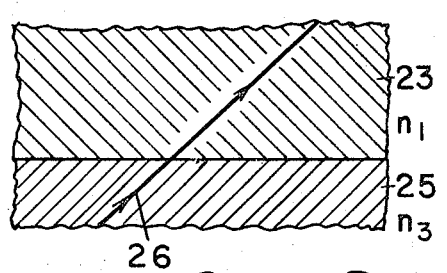
Edgar E. Price Dec. 13, 1966     E. E. PRICE     3,291,554
OPTICAL NEUTRAL CONTROLLABLE DENSITY FILTER
Filed Feb. 19, 1963     2 Sheets-Sheet 2

Edgar E. Price

United States Patent Office 3,291,554
Patented Dec. 13, 1966

3,291,554
OPTICAL NEUTRAL CONTROLLABLE DENSITY FILTER
Edgar E. Price, 648 Applegrove Circle,
Webster, N.Y. 14580
Filed Feb. 19, 1963, Ser. No. 259,545
3 Claims. (Cl. 350—285)

This invention relates to new and improved optical systems and more particularly to an improved optical neutral controllable density filter.

The system comprising this invention permits providing an optical neutral controllable density filter capable of exteremely rapid operation from an open position of low density to a closed position of high density or from the closed position to the open position.

It is an object of this invention to provide an optical neutral controllable density filter having an open position in which substantially all the light incident upon the filter is transmitted and a closed position in which only a very small fraction of the light incident upon the filter is transmitted, corresponding to the fraction of incident light transmitted by a neutral density filter of density two or greater, and capable of changing with extreme rapidity from one position to the other or to some intermediate position in response to an applied signal.

It is another object of this invention to provide a rapidly operating optical controllable density filter that functions equally upon light of all frequencies transmitted by the filter and is not sensitive to the frequency of the incident light. Other objects and many of the attendant advantages of this invention will be readily appreciated as the same becomes better understood by reference to the following detailed description when considered with the accompanying drawings wherein:

FIG. 1, FIG. 2, FIG. 3, and FIG. 4 are diagrammatic sectional views of optical interfaces;

FIG. 5 and FIG. 6 are diagrammatic sectional views of one form of optical controllable density filter in the open and closed positions respectively;

FIG. 7 and FIG. 8 are diagrammatic sectional views of another form of optical controllable density filter having a different surface configuration of the light absorbing medium in open and partially closed positions respectively.

Figure 9:
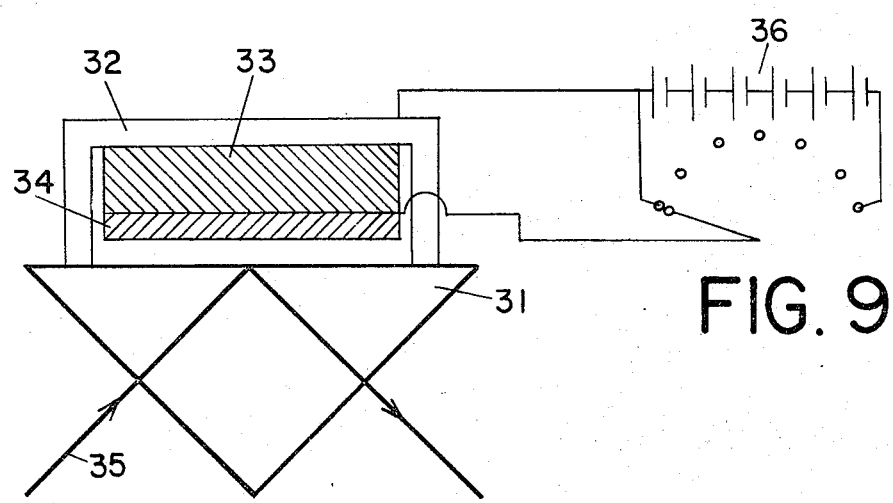
FIG. 9 and FIG. 10 are diagrammatic side and partially sectionalized views of an optical controllable density filter in the open and closed positions respectively.

An optical interface is a thin region in the immediate vicinity of a surface dividing two media having different optical characteristics.

When light is incident upon an optical interface dividing two light transmitting media having different indices of refraction part of the incident light is reflected and part transmitted at the interface, unless the light is incident upon the interface from the more dense medium at a large enough angle of incidence to produce total internal reflection, in which case no light is transmitted through the second medium.

When two light transmitting media of identical indices of refraction and mating surfaces are separated by air or a vacuum, light incident on either surface will be partially-transmitted and partially-reflected or totally-reflected. If the separation between mating surfaces is suddenly reduced to zero, the interfaces no longer exist optically and light incident upon the surface of contact between the two materials continues on its path of propagration without any fraction being reflected. If the second material is transmitting but strongly absorbing, the light will be attenuated upon entering and traversing a small distance through the second medium.

When total internal reflection occurs at an interface, light energy penetrates from the more dense medium into the less dense medium for a distance variously stated in the optical literature as 3 to 5 wavelengths. In this case a sharp reduction in the intensity of reflected light can be caused to occur by bringing an absorbing material with a properly contoured and oriented surface into the interface region of 3 to 5 wavelengths thickness, where light temporarily penetrates into the less dense medium, without necessarily coming into contact with the reflecting surface.

A thin coating of an optical medium located on a surface of piezoelectric material can be moved rapidly into position in an optical interface region to change the optical properties of the interface. The amount of motion required is sufficiently small to be provided effectively by a suitably chosen piezoelectric material which can also react very rapidly to provide an extremely short response time.

With reference more particularly to FIG. 1, numeral 1 identifies an optical interface shown as a plane surface separating less dense medium 2 from more dense medium 3 having indices of refraction $n$ and $n'$ respectively. Numeral 4 identifies a ray of light propagated in the less dense medium 2 toward interface 1. Numeral 5 identifies a normal to plane interface 1 at the point of intersection of incident light ray 4 with plane interface 1. Numerals 6 and 7 identify the components of light ray 4 that are respectively transmitted and reflected at optical interface 1. The angle of incidence of light ray 4 is $i_a$, the angle of refraction of light ray 6 is $i_a'$, and the angle of reflection of light ray 7 is $i_a''$, numerically equal to $i_a$ but oppositely directed from normal 5. FIG. 1 is a typical diagram used to illustrate one of the most basic laws of optics, Snell's Law which states that $n \sin i = n' \sin i'$. Other laws are applied to determine the fractions of incident light ray 4 that are separated into refracted ray 6 and reflected ray 7.

FIG. 2 is similar to FIG. 1, differing in that the angle of incidence of the light ray propagated toward the optical interface through the less dense medium is almost 90°, resulting in an angle of refraction for the refracted ray propagated away from the optical interface in the more dense medium that is nearly equal to the critical angle. At an optical interface between a given pair of optical dielectric media having different indices of refraction the critical angle is defined as the angle of refraction for a light ray incident on the optical interface in the less dense medium with an angle of incidence of 90°. In FIG. 2 numeral 8 identifies the interface, numeral 9 identifies the less dense medium with index of refraction $n$, numeral 10 identifies the more dense medium with index of refraction $n'$, numeral 11 identifies the incident ray in the less dense medium having angle of incidence $i_b$, numeral 12 identifies the normal to the interface 8 at the point of intersection of incident ray 11 with interface 8, numeral 13 identifies the ray refracted into the more dense medium 10 with angle of refraction $i_b'$, and numeral 14 identifies the part of incident ray 11 reflected from interface 8 with angle of reflection $i_b''$. Numeral 15 identifies the boundary of the critical angle $i_{bc}$.

The importance of the critical angle is that a light ray propagated in a more dense medium toward the interface with an angle of incidence greater than the critical angle will be totally reflected at the interface and all the energy in the incident ray will be in the reflected ray. There will be no refracted ray in this case.

FIG. 3 illustrates a case of total internal reflection. Numeral 16 identifies the interface between a less dense medium 17 with index of refraction and more dense medium 18 with index of refraction $n'$. A ray of light 19 in more dense medium 18 incident upon interface 16 with angle of incidence greater than the critical angle $i_{cc}$ is reflected back into the more dense medium along the path shown as 20. The critical is shown as $i_{cc}$ between normal 21 and line 22.

FIG. 4, an enlarged view of the point at which incident ray 19 intersects interface 16, illustrates the fact that light totally reflected within a more dense medium actually goes into the less dense medium and returns into the more dense medium. The region of penetration is a space variously stated in the optical literature as being 3 to 5 wavelengths in thickness. The significance of this layer of light energy is that it provides an interface region in which operations can be performed on the light to modify its intensity before it returns into the more dense medium, particularly if the less dense medium is air or an evacuated space. The curved path of the light ray in the interface region of the less dense medium is representational only and does not ncessarily represent the actual light path.

FIG. 5 and FIG. 6 illustrate an arrangement of optical media providing a means for changing the optical characteristics of an interface by varying the location of one of the optical media with respect to the interface. $n_1$, $n_2$, and $n_3$ represent the indices of refraction of the media identified by numerals 23, 24, and 25, respectively. Medium 24 is a liquid or a gas or a vacuum, permitting its thickness to change readily through relative movement of media 23 and 25. If optical medium 23 is mounted on a moving means it is readily possible to move medium 23 through medium 24 with respect to medium 25. Various optical effects will result through relative motion of media depending upon the values of each index of refraction. One particular case will be discussed as representative of specific optical effects that can be caused to occur having particular usefulness.

Consider a case in which media 23 and 25 are glass separated by air, medium 24. Media 23 and 25 have identical indices of refraction but medium 25 is clear while medium 23 is highly absorbing. When spaced as shown in FIG. 2a where the thickness of medium 24 is greater than 3 to 5 wavelengths of light, a ray of light 26 incident from within medium 25 on the interface between medium 25 and medium 24 at an angle of incidence greater than the critical angle will be totally reflected. If now medium 23 is brought into contact with medium 25 and the thickness of medium 24 is reduced to zero, as shown in FIG. 6, the interface between media 23 and 25 will appear to the light ray as a continuous medium because, as stated above, the indices of refraction for media 23 and 25 are identical. Thus no reflection will occur. Furthermore, since medium 23 is highly absorbing the light will be attenuated and lost. Thus the movement of medium 23 from a position corresponding to that shown in FIG. 5 to a position corresponding to that shown in FIG. 6 results in a change in the intensity reflected from the surface of medium 25 from a maximum to zero. In a practical case the degree to which the light reflected can be reduced depends upon how closely the indices of refraction between media 23 and 25 can be matched. By causing medium 23 to move very rapidly, a quick change can be made to result between a condition of high transmission and very low or zero transmission. By placing medium 23 within 3 to 5 wavelengths of medium 25 a condition of partial reflection and partial transmission can be caused to occur decreasing the intensity of reflected light to a lesser degree than will occur when media 23 and 25 are in actual contact as shown in FIG. 6.

Figure 8:
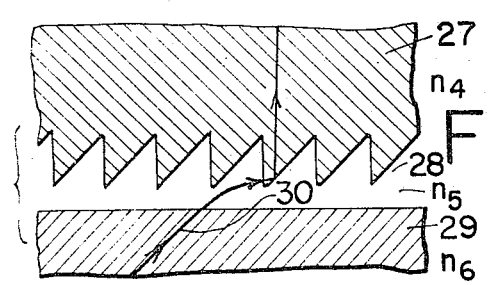

Efficient performance of an optical neutral controllable density filter fabricated with optical elements arranged as shown in FIG. 5 and FIG. 6 requires a good contact between the surfaces of media 23 and 25 when they are in contact as shown in FIG. 6. When good optical contact is made, it is difficult to break and revert the optical elements from relative positions corresponding to those shown in FIG. 6 to those shown in FIG. 5. FIG. 7 and FIG. 8 illustrate an improved surface configuration of the absorbing medium to eliminate the need for tight physical contact between the surfaces of the shutter when in a completely closed position. In FIG. 7 and FIG. 8 optical medium 27 with index of refraction $n_4$ has a surface ruled as in a diffraction grating. Optical medium 28 with index of refraction $n_5$ is fluid, gaseous, or vacuum with a very low index of refraction. Optical medium 29 with index of refraction $n_6$ is a high density medium similar to $n_4$. When the separation between media 27 and 29 is reduced light rays such as 30 are intercepted by the surfaces of the grating and absorbed without the need for tight optical contact between medium 27 and 29 thus permitting easy separation of media to decrease the filter density. The fraction of light transmitted by an optical neutral controllable density filter can be controlled by varying the separation of media 27 and 29 within the 3 to 5 wavelength space near the surface of medium 29 in which light energy exists when light is totally reflected at that surface. By mounting medium 27 on a moving means responding to an applied signal by changing the distance of the grating configured surface of medium 27 from the smooth surface of medium 29 modulation of the light transmitted by total internal reflection can be accomplished. Such modulation can occur as rapidly as the time constants of the moving means and the inertia of medium 27 permit. It should be noted that modulation of light by this means is not based upon the optical phenomenon of interference of light.

Medium 23 of FIG. 5 and FIG. 6 and medium 27 of FIG. 7 and FIG. 8 can be mounted on any suitable moving means responding to an applied signal with a proper motion. Some examples of suitable moving means are piezoelectric material, magnetostrictive material, and electromechanical transducers.

Figure 10:
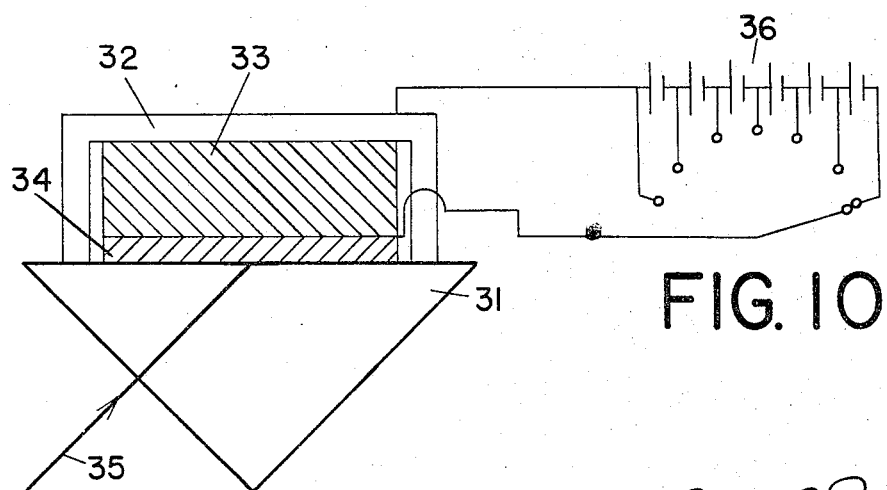

FIG. 9 and FIG. 10 illustrate side views of one form of a complete optical controllable neutral density filter shown as completely open in FIG. 9 and completely closed in FIG. 10. In FIG. 9 and FIG. 10 numeral 31 identifies a right angle or Porro prism. 32 identifies a bracket fixed to the hypotenusal face of prism 31. Piezoelectric material 33 is attached to bracket 32. Optical absorbing material 34 is attached to and moves with piezoelectric material 33. A source of electrical potential is shown at 36 to illustrate that the actual position of the surface of optical absorbing material depends upon applied voltage.

In FIG. 9 a setting of zero volts is shown on source of electrical potential 36 and the piezoelectric material 33 is shown in its rest position. The surface of optical absorbing material 34 that is not attached to piezoelectric material 33 is retracted from the hypotenusal face of right angle prism 31 by an amount greater than the 3 to 5 wavelength thickness in which light energy exists when total reflection occurs at that interface. In FIG. 9 light ray 35 is shown as a totally reflected light ray.

In FIG. 10 a maximum voltage setting is shown on source of electrical potential 36 and piezoelectric material 33 is shown with increased thickness just sufficient to move optical absorbing material by the maximum required amount.

The surface of optical absorbing material 34 can either be contoured to mate with the hypotenusal face of right angle prism 31 as shown in FIG. 5 and FIG. 6 or it can be in some other form such as that illustrated in FIG. 7 and FIG. 8 not requiring tight contact with the hypotenusal face of right angle prism 31.

In FIG. 10 light ray 35 is shown incident upon the interface between the hypotenusal face of right angle prism 31 and optical absorbing medium 34. Light ray 35 is absorbed by optical absorbing medium 34.

Right angle prism 31 provides a convenient way to provide for internal reflection of the light to be transmitted or absorbed. It is not necessary that a right angle prism be used so long as some provision is made for internal reflection at the interface adjacent to the movable optical absorbing medium.

As stated previously, the fraction of incident light reflected is determined by the position of the surface of the absorbing medium in the 3 to 5 wavelength interfacial region of light energy. By replacing the source of fixed discrete values of electrical potential shown at 36 with a continuously and rapidly varying source of electrical potential or signal the light transmitted by the optical neutral controllable density filter can be modulated in intensity in correspondence with the value of the applied signal.

A multilayer assembly of piezoelectric material may be used instead of the single thickness illustrated in FIG. 9 and FIG. 10 to provide the required displacement with a lower value of electrical potential in an optical neutral controllable density filter intended for use in applications requiring only two values of density and thus not requiring the piezoelectric material to respond linearly with frequency.

Obviously, many modifications and variations of the present teachings are possible in the light of the above explanations and description. It is therefore to be understood that within the scope of the appended claims the invention may be practiced otherwise than as specifically described without departing from the spirit of the invention.

What is claimed is:

1. An optical system for controlling the fraction of incident light totally internally reflected from an optical surface forming an interface between two optically transparent media in response to an applied signal comprising; an optically transparent body, a plane surface on said body for receiving light rays from within said body incident upon said surface at an angle greater than the angle for total internal reflection, an optically transparent element including a plane grating having a series of successive ridges spaced from but adjacent to said plane surface, means for moving said element within at maximum 3 to 5 wavelengths from said plane surface in response to an applied signal, said ridges having faces oriented to intercept and absorb a portion of said light rays when said element is within 3 to 5 wavelengths from said plane surface whereby the fraction of light reflected from said plane surface is controlled.

2. An optical system according to claim 1 in which said means for moving said optically transparent element comprises a subassembly of piezoelectric material whose thickness changes in response to an applied electrical signal.

3. An optical system according to claim 1 in which said means for moving said optically transparent element comprises a subassembly of magnetostrictive material whose length changes in response to an applied magnetic signal.

References Cited by the Examiner

UNITED STATES PATENTS

| 2,455,763 | 12/1948 | Harrison | 88—61 |
| 2,997,922 | 8/1961 | Kaprelian | 88—61 |
| 3,035,492 | 5/1962 | Blythe | 88—61 |

OTHER REFERENCES

Nicoll: "Light Amplifier Using Sintered Photoconductors," RCA Technical Notes, June, 1960, pp. 1–3.

JEWELL H. PEDERSEN, *Primary Examiner.*

RONALD L. WIBERT, *Examiner.*

E. S. BAUER, *Assistant Examiner.*